(12) United States Patent
Bekiarian

(10) Patent No.: US 7,553,543 B2
(45) Date of Patent: Jun. 30, 2009

(54) COMPOSITE STRUCTURE HAVING A FLUOROELASTOMERIC ANTI-REFLECTIVE COATING WITH NON-FLUORINATED CROSS-LINKING

(75) Inventor: Paul Gregory Bekiarian, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 428 days.

(21) Appl. No.: 11/303,599

(22) Filed: Dec. 16, 2005

(65) Prior Publication Data

US 2007/0141357 A1 Jun. 21, 2007

(51) Int. Cl.
*C08F 259/00* (2006.01)
*B32B 27/00* (2006.01)
*B05D 5/06* (2006.01)
*C07C 61/08* (2006.01)

(52) U.S. Cl. .................. 428/421; 525/102; 525/254; 525/276; 427/162; 427/372.2

(58) Field of Classification Search ............ 428/421; 525/102, 254
See application file for complete search history.

(56) References Cited

U.S. PATENT DOCUMENTS

| | | | |
|---|---|---|---|
| 2,968,649 A | 1/1961 | Pailthorp et al. | |
| 3,051,677 A | 8/1962 | Rexford | |
| 3,274,088 A | 9/1966 | Wolinski | |
| 3,682,872 A | 8/1972 | Brizzolara et al. | |
| 4,035,565 A | 7/1977 | Apotheker et al. | |
| 4,281,092 A | 7/1981 | Breazeale | |
| 4,694,045 A | 9/1987 | Moore | |
| 5,151,492 A | 9/1992 | Abe et al. | |
| 5,692,088 A * | 11/1997 | Ishiharada et al. | 385/125 |
| 5,789,509 A | 8/1998 | Schmiegel | |
| 5,824,755 A | 10/1998 | Hayashi et al. | |
| 6,383,559 B1 | 5/2002 | Nakamura et al. | |
| 6,489,420 B1 * | 12/2002 | Duchesne et al. | 526/255 |
| 6,773,121 B2 | 8/2004 | Miyatake et al. | |
| 2003/0068486 A1 | 4/2003 | Arney et al. | |
| 2005/0182199 A1 | 8/2005 | Jing et al. | |
| 2005/0187333 A1 | 8/2005 | Yoshizawa | |
| 2006/0147723 A1 * | 7/2006 | Jing et al. | 428/421 |

FOREIGN PATENT DOCUMENTS

| | | |
|---|---|---|
| CA | 2067891 | 11/1992 |
| EP | 398241 A2 * | 11/1990 |
| WO | WO 2006/073785 A1 | 7/2006 |
| WO | WO 2006/073867 A1 | 7/2006 |

OTHER PUBLICATIONS

Results of Partial International Search for International Application No. PCT/US2006/046509.
Christine (Qin) Sun et al, Corona Treatment of Polyolefin Films—A Review, Advances in Polymer Technology, vol. 18, No. 2, 171-180, 1999.
Anestis L. Logothetis, Chemistry of Fluorocarbon Elastomers, Prog. Polym. Sci., vol. 14, 251-296, 1989, Pergamon Press PLC, Great Britain.

* cited by examiner

Primary Examiner—David R Sample
Assistant Examiner—Ellen S Wood

(57) ABSTRACT

Optical articles, such as displays, optical lenses, windows, optical polarizers and transparent films are made as a composite structure comprising a substrate and an anti-reflective coating applied to the substrate. The anti-reflective coating comprises: A) a fluoroelastomer having cures sites selected from the group consisting of bromine atoms, chlorine atoms, iodine atoms, non-conjugated dienes, and mixtures of two or more thereof; and B) a non-fluorinated multiolefinic cross linking agent. The surface of the substrate may be treated by simultaneously bombarding the surface with an ionized inert gas, and etching the surface with an ionized reactive gas, so as to improve the adhesion of the coating to the substrate.

10 Claims, No Drawings

COMPOSITE STRUCTURE HAVING A FLUOROELASTOMERIC ANTI-REFLECTIVE COATING WITH NON-FLUORINATED CROSS-LINKING

BACKGROUND OF THE INVENTION

1. Field of the Invention

The present invention relates to the field of anti-reflective coating for reducing reflection the surfaces of optical articles, such as displays, optical lenses, windows, optical polarizers and transparent films. More specifically, it relates to an anti-reflective coating comprising a fluoroelastomer containing a non-fluorinated cross-linking agent, where the coating has a low refractive index and good adhesion properties.

2. Description of Related Art

Optical materials are characterized by their refractive index. Whenever light travels from one material to another of different index, some of the light is reflected. Unwanted reflections can be substantially reduced by providing an anti-reflective coating on the surface of an optical article at a specified thickness. For an optical article with refractive index n, in order to reach the maximum effectiveness, the coating should have the optical thickness (the physical thickness multiplied by its own refractive index) about a quarter of the wavelength of the incoming light and have a refractive index of the square root of n. Most optical articles have refractive index ranging from 1.4 to 1.6.

It is known that the low reflective index polymer layers used in anti-reflective films can be derived from fluorine containing polymers. The refractive index of fluorinated polymer coating layers can be dependent upon the volume percentage of fluorine contained within the layer. Increased fluorine content in the layers typically decreases the refractive index of the coating layer. Thus, attention has been focused on increasing fluoropolymer content in anti-reflective coatings. See US Patent Application Publication 2005/0182199 to 3M, which discloses a fluoro-alkyl containing multi-olefinic crosslinker.

However, fluoropolymers have very poor adhesion to common substrates like plastics and glass. Various modifications have been made in order to improve their adhesion to a substrate. For instance, U.S. Patent Publication No. 2003/0068486, also assigned to 3M, discloses an anti-reflective coating which includes a layer of fluorinated material, which imparts the anti-reflective properties, covalently attached to the surface of the hardcoat layer.

Nonetheless, there still exists a need for a low refractive index anti-reflective coating which has good adhesion, as well as good scratch resistance.

BRIEF SUMMARY OF THE INVENTION

The present invention overcomes the problems associated with the prior art by an anti-reflective fluoroelastomeric coating having a non-fluorinated cross-linking agent. This anti-reflective coating has good adhesion properties, and is durable and scratch resistant.

It is surprising that the use of a non-fluorinated cross-linking agent in an elastomeric anti-reflective coating can provide a low refractive index as well as scratch resistance. Moreover, the fluoroelastomer of the anti-reflective coating of the present invention has the advantage that it is soluble in organic solvent. These advantages make the present invention particularly useful for providing anti-reflective coatings.

Therefore, in accordance with the present invention, there is provided a composite structure comprising a substrate and an anti-reflective coating applied to the substrate. A composite structure comprising a substrate and an anti-reflective coating applied to the substrate, wherein the anti-reflective coating comprises: A) a fluoroelastomer having cures sites selected from the group consisting of bromine atoms, chlorine atoms, iodine atoms, non-conjugated dienes, and mixtures of two or more thereof; and B) a non-fluorinated multi-olefinic cross linking agent.

It is also surprising that a fluoroelastomeric coating can achieve good adhesion. The adhesion of the fluoroelastomeric coating is enhanced with the present invention by the use of a reactive ion etching process, which forms a microstructured surface on the substrate. This process includes the steps of (a) bombarding the surface with a first gas and (b) etching the surface with a second gas to form this microstructured surface. Preferably, the first gas is argon, and the second gas is oxygen, which chemically etches the surface. The surface is preferably bombarded simultaneously with these gases, resulting in a dense, brush-like uneven surface.

DETAILED DESCRIPTION

Fluoroelastomers suitable for use as the anti-reflective coating of the invention include fluoroelastomers comprising copolymerized units of one or more monomers containing fluorine, such as vinylidene fluoride, hexafluoropropylene, 1-hydropentafluoropropylene, 2-hydropentafluoropropylene, tetrafluoroethylene, chlorotrifluoroethylene, and perfluoro(alkyl vinyl ether), as well as other monomers not containing fluorine, such as ethylene, and propylene. Elastomers of this type are described in Logothetis, *Chemistry of Fluorocarbon Elastomers*, Prog. Polym. Sci., Vol. 14, 251-296 (1989). The polymers may be prepared by polymerization of the appropriate monomer mixtures with the aid of a free radical generating initiator either in bulk, in solution in an inert solvent, in aqueous emulsion or in aqueous suspension. The polymerizations may be carried out in continuous, batch, or in semi-batch processes. General preparative processes are disclosed in the Logothetis article and in U.S. Pat. Nos. 4,281,092; 3,682,872; 4,035,565; 5,824,755; 5,789,509; 3,051,677; and 2,968,649.

Specific examples of such fluoroelastomers include, but are not limited to copolymers of vinylidene fluoride and hexafluoropropylene and, optionally, tetrafluoroethylene; copolymers of vinylidene fluoride, hexafluoropropylene, tetrafluoroethylene and chlorotrifluoroethylene; copolymers of vinylidene fluoride and a perfluoro(alkyl vinyl ether) and, optionally, tetrafluoroethylene; copolymers of tetrafluoroethylene and propylene and, optionally, vinylidene fluoride; and copolymers of tetrafluoroethylene and perfluoro(alkyl vinyl ether), preferably perfluoro(methyl vinyl ether). Each of the fluoroelastomers of the composition of the invention also comprises at least one halogenated cure site or a reactive double bond resulting from the presence of a copolymerized unit of a non-conjugated diene. The halogenated cure sites may be copolymerized cure site monomers or halogen atoms that are present at terminal positions of the fluoroelastomer polymer chains. The cure site monomers, reactive double bonds or halogenated end groups are capable of reacting to form crosslinks. The cure site monomers are selected from the group consisting of brominated, chlorinated, and iodinated olefins; and brominated, chlorinated, and iodinated unsaturated ethers and non-conjugated dienes.

The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2Br-R_f-O-CF=CF_2$, such as $CF_2BrCF_2O-CF=CF_2$, and fluorovinyl ethers of the class $ROCF=CFBr$ or $ROCBr=CF_2$, where R is a lower alkyl group or fluoroalkyl group, such as $CH_3OCF=CFBr$ or $CF_3CH_2OCF=CFBr$.

Iodinated olefins may also be used as cure site monomers. Suitable iodinated monomers include iodinated olefins of the formula: $CHR=CH-Z-CH_2CHR-I$, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1; 3-chloro 4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1,4-iodo-3,3,4,4-tetrafluorobutene-1, and bromotrifluoroethylene.

Additionally, or alternatively, iodine atoms, bromine atoms or mixtures thereof may be present at the fluoroelastomer polymer chain ends as a result of the use of chain transfer or molecular weight regulating agents during preparation of the fluoroelastomers. Such agents include iodine-containing compounds that result in bound iodine at one or both ends of the polymer molecules (U.S. Pat. No. 4,243,770). Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Copolymers of ethylene, tetrafluoroethylene, perfluoro (alkyl vinyl ether) and a bromine -containing cure site monomer, such as those disclosed by Moore, in U.S. Pat. No. 4,694,045 are also suitable for use in the present invention.

The anti-reflective coating of the present invention further comprises a non-fluorinated multiolefinic cross linking agent. By "non-fluorinated" it is meant that the crosslinking agent contains no covalently bonded fluorine atoms. By "multi-olefinic" it is meant that the crosslinking agent contains at least two non-conjugated carbon-carbon double bonds. Typically, the cross-linking agent is present in an amount of 1 to 25 parts by weight per 100 parts by weight elastomer (phr). Preferably, the cross-linking agent is present at a level between 1 and 10 phr. The cross-linking agent has the general formula $R(OC(O)CR'=CH_2)_n$ where R is linear or branched alkyl, or linear or branched alkyl ether, or aromatic, or aromatic ether, or heterocyclic; and wherein R' is H, or $CH_3$; and wherein n is an integer from 2 to 8. Preferably, the non-fluorinated multiolefinic cross linking agent has the general formula $R(CH_2CR'=CH_2)_n$ where R is linear or branched alkyl, or linear or branched alkyl ether, or aromatic, or aromatic ether, or aromatic ester, or heterocyclic; and wherein R' is H, or $CH_3$; and wherein n is an integer from 2 to 6.

The compositions of the present invention are cured via a free radical mechanism. Free radicals may be generated by several different means such as by the thermal decomposition of an organic peroxide optionally contained in the compositions of this invention, or by radiation such as ultraviolet (UV) radiation, gamma radiation, or electron beam radiation.

When UV radiation initiation is used, the anti-reflective coatings of the invention may also include a photo-initiator. Anti-reflective coatings of the invention which contain a photoinitiator typically contain between 1 and 10 phr, preferably between 5 and 10 phr. Examples of photoinitators include but are not limited to Irgacure®-651 (Ciba Specialty Chemicals, Basel, Switzerland), Irgacure®-184, and Irgacure®-907. In addition, the photoinitiators may be used singly or in combinations of two or more types.

Anti-reflective coatings of the invention which contain an organic peroxide typically contain between 1 and 10 phr, preferably between 5 and 10 phr. Examples of organic peroxides which may be employed in the compositions of the invention include, but are not limited to 1,1 -bis(t-butylperoxy)-3,5,5-trimethylcyclohexane; 1,1-bis(t-butylperoxy)cyclohexane; 2,2-bis(t-butylperoxy)octane; n-butyl-4,4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha, alpha'-bis(t-butylperoxy-m-isopropyl)benzene; 2,5-dimethyl-2,5-di(t-butylperoxy)hexane; 2,5-dimethyl-2,5-di(t-butylperoxy) hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. A preferred example of an organic peroxide is benzoyl peroxide. In addition, the organic peroxides may be used singly or in combinations of two or more types, as well as in combination with photoinitators as described above.

It is also within the scope of the present invention to use the non-fluorinated cross-linking agents of the present invention either singly or in combination of two or more types, as well as in combination with various photoinitiators and peroxides as described above. In addition, it is within the scope of the present invention to use a fluorinated cross-linking agent in combination with the non-fluorinated cross-linking agent of the present invention.

Substrates used in this invention for anti-reflective coating can be any optical articles such as display surfaces, optical lenses, windows, optical polarizers, optical filters, glossy prints and photographs, clear polymer films, and the like. The substrate may be either transparent or anti-glare. These optical articles can be made of acetylated cellulose (e.g., triacetyl cellulose, or TAC), polyester (e.g., polyethylene terephthalate, or PET), polycarbonate, polymethylmethacrylate, polyacrylate, polyvinyl alcohol, polystyrene, glass, vinyl, nylon, and the like. Preferred substrates are made of triacetyl cellulose, PET, polymethylmethacrylate, and glass. The substrates can have an optional hardcoat applied between the substrate and the anti-reflective coating, such as but not limited to an acrylate hardcoat. Suitable substrates and hardcoat are described generally in U.S. Pat. No. 6,383,559 and U.S. Pat. No. 6,773,121.

The anti-reflective coating as described above, as applied to a substrate to form a structure according to the present invention, can have a thickness less than 120 nm and greater than 80 nm, and preferably less than 110 nm and greater than 90 nm.

For structures of the present invention that have transparent substrates, the specular reflectance is less than or equal to 1.3%; for those that have anti-glare substrates the total reflectance is less than or equal 2.5. As used herein, the terms "specular reflection" and "specular reflectance" refer to the reflectance of light rays into an emergent cone with a vertex angle of 1 degree centered around the specular angle. The terms "diffuse reflection" or "diffuse reflectance" refer to the reflection of rays that are outside the specular cone defined above. The terms "total reflectance" or "total reflection" refer to the combined reflectance of all light from a surface. Thus, total reflection is the sum of specular and diffuse reflection.

For structures of the present invention using either type of substrate, the change in reflectance (delta Rvis) after abrasion with steel wool is less than or equal to 0.5%. Since this can be negative, this term may also be referred to hereinafter as the absolute value of the change in specular reflectance.

Further according to the present invention, there is provided a method of applying the anti-reflective coating as described above to a substrate. Any conventional method may be used to coat the substrate, including gravure, microgravure, and slot die coating, as well as brushing, spraying, spin-casting, dipping or printing. A microgravure coating method which can be used with the present invention is described in US 2005/18733.

According to this method, the surface of the substrate may optionally be treated before the anti-reflective coating is applied thereto. In a preferred embodiment, hard coat TAC (transparent or anti-glare) is one of the preferred substrates. In this embodiment, in the case of transparent HC-TAC, it is the hard-coat (HC) that is treated before application of the AR coating of the present invention. In the case of AG-TAC, it is the anti-glare (AG) surface that is treated before the application of the AR coating of the present invention.

Examples of surface treatment include but are not limited to corona treatment, application of a adhesion promoter, and reactive ion etching (RIE).

Corona treatment is well known in the art and is generally described in U.S. Pat. No. 3,274,088 and Sun, et. al, Advances in Polymer Technology (1999), 18(2), 171-180.

Adhesion promoters may preferably be a silane coupling agent, such as but not limited to acryloxy propyl trimethoxy silane, allyl trimethoxy silane and aminopropyl trimethoxy silane.

According to the present invention, reactive ion etching is used as a method of forming a microstructured surface by means of bombarding the surface with one gas to form indentations in the surface, and etching the surface with another gas. Both of these steps of bombarding the surface form indentations in the surface, and the use of these steps, especially simultaneously, results in an unevenly etched surface, which is referred to herein as "microstructured". The microstructured surface is a dense, brush-like surface composed of fibrils having a tip diameter comparatively larger than shaft diameter. This microstructured surface is formed without the use of a masking material, as compared to the formation of microstructured surfaces of the prior art.

The anti-reflective coating as described above is applied to the substrate, or when a hardcoat is used, the coating is applied to the hardcoat. Most hardcoats are amorphous, and the substrate itself can be amorphous. Thus, the surface which is treated can consist essentially of (i.e., is primarily) amorphous material. However, depending on the composition of the substrate, the surface which is treated may or may not be amorphous.

The bombardment of the surface with the first gas and the etching of the surface with the second gas are preferably done simultaneously. Preferably, the first gas which is used to bombard the surface is an ionized inert gas, and more preferably, this gas is argon. The second gas which is used to etch the surface, and preferably chemically etch the surface, is an ionized reactive gas, and more preferably, this gas is oxygen. The surface is etched by this second gas by means of reactive ion etching.

EXAMPLES

Methods

Method 1: Surface Abrasion with Steel Wool

A strip of hard-coated or anti-glare triacetyl cellulose film (3.7 cm×7.5 cm) that was coated with an anti-reflective coating formulation was mounted, coated surface up, onto the surface of a flat glass plate by fastening the edges of the film to the plate with adhesive tape. A 1 cm×1 cm piece of #0000 steel wool (Liberon), weighted by a 200 g load, was placed on the film surface and rubbed back and forth, for 10 cycles (20 passes) over a distance of 3 cm at a velocity of 5 cm/sec.

Method 2: Surface Treatment by Reactive Ion Etch (RIE)

A strip of hard-coated or anti-glare triacetyl cellulose film (3.7 cm×7.5 cm) was cleaned to remove surface debris then mounted on the surface of a glass microscope slide (5 cm×7.5 cm), with the hard-coated or anti-glare surface of the film facing outward, by fastening the edges of the film to the slide with adhesive tape. The mounted hard-coated or anti-glare triacetyl cellulose film was placed into a parallel plate type reactive ion etch chamber (SemiGroup PE/PECVD SYS 1000) with the hard coated or anti-glare surface exposed and facing up. After sealing the chamber and evacuating, a mixture of argon and oxygen was introduced to the chamber at flow rates of 80 sccm and 20 sccm, respectively. Vacuum was applied to maintain a continuous pressure in the chamber of 180 mTorr. The plasma was ignited with 900 watts RF energy at 13.56 MHz, which resulted in a potential of 520 Volts across the parallel plates, and was maintained for 20 seconds. After 20 seconds, the plasma was extinguished, the chamber was purged with nitrogen and the mounted triacetyl cellulose films were removed. The so-treated triacetyl cellulose films were coated with an anti-reflective coating formulation of the present invention within 1 hour of treatment.

Method 3: Measurement of Specular Reflectance

A strip of hard-coated triacetyl cellulose film (3.7 cm×7.5 cm) that was coated with an anti-reflective coating formulation of the present invention is prepared for measurement by adhering a strip of black PVC electrical tape (Nitto Denko, PVC Plastic tape #21) to the uncoated side of the film, in a manner that excludes trapped air bubbles, to frustrate the back surface reflections. The prepared film is then held fixed and flat, with coated surface up, on the stage of an infra-red extended range spectrometer (Filmetrics, model F50) using adhesive tape or a flat weight. The infra-red spectrometer is calibrated with a low reflectance standard of BK7 glass with its back surface roughened and blackened. The specular reflection is measured at normal incidence with an acceptance angle of about 2 degrees. The reflection spectrum is recorded in the range from 400 nm to 1700 nm with about a 1 nm interval. A low noise spectrum is obtained by using a long detector integration time so that the instrument is at full range or saturated with about a 6% reflection. A further noise reduction is achieved by averaging 3 or more separate measurements of the spectrum. The reflectance reported from the recorded spectrum is the result of a color calculation of x, y, Y where Y is reported as the specular reflectance (Rvis).

Method 4: Measurement of Total Reflectance

A strip of anti-glare triacetyl cellulose (AG-TAC) film (3.7 cm×7.5 cm) that was coated with an anti-reflective coating formulation is prepared for measurement by adhering a strip of black PVC electrical tape (Nitto Denko, PVC Plastic tape #21) to the uncoated side of the film, in a manner that excludes trapped air bubbles, to frustrate the back surface reflections. The so-prepared film is then mounted flat on a 5 cm×7.5 cm glass slide so that the black PVC electrical tape is in contact with the glass. The mounted film is held up to the sample orifice of a 4 inch diameter integrating sphere and is further positioned at a 7° angle with respect to the tangent to the surface of the 4-inch diameter integrating sphere at the sample orifice. Light from a strong white light source (a metal halogen arc lamp) is directed to the integrating sphere using a ½ inch optical fiber bundle. The light exiting the fiber bundle is imaged by a lens before it enters the integrating sphere though the input orifice positioned directly opposite (180 degrees) to the sample orifice. The focused light impinges directly onto the sample at 7° off normal incidence. The total reflected light from the sample, both the specular and diffuse reflections, are reflected into the integrating sphere. The light from the integrating sphere is monitored through a small hole orifice at 90° from the sample orifice. A 600 µm diameter, multimode, optical fiber cable carries the light from the sphere to an infra-red extended range spectrometer (Filmetrics, model F50) for measurement. A low noise spectrum is obtained by signal averaging. The reflectance reported from the recorded spectrum is the result of a color calculation of x, y, Y where Y is reported as the total reflectance.

The infra-red spectrometer is calibrated prior to the measurement by placing a sample of known reflectivity at the sample orifice. The instrument gain vs. wavelength is adjusted to obtain the known reflectivity spectrum of the calibration sample. The zero level is obtained leaving the sample orifice open and letting the input light beam pass through and out of the integrating sphere with no reflection.

EXAMPLES

Example 1

Formulation A was prepared by dissolving 4.5 g Vitone® GF-200S fluoroelastomer (DuPont), 0.45 g benzoyl peroxide (Aldrich) and 1.125 g pentaerythritol tetraacrylate (Aldrich) in 95.5 g propyl acetate, then filtering the solution through a 0.2µ Teflon® PTFE membrane filter. A strip of hard-coated triacetyl cellulose (HC-TAC) film (3.7 cm×7.5 cm) was cleaned to remove surface debris by rinsing with a stream of n-hexane followed by rinsing with a stream of iso-propyl alcohol followed by blowing dry with a stream of filtered (0.2µ) nitrogen. The cleaned strip of HC-TAC film was mounted on the surface of a glass microscope slide (5 cm×7.5 cm), with the hard-coated surface of the HC-TAC film facing outward, by fastening the edges of the film to the slide with adhesive tape. The mounted HC-TAC film was coated with formulation A by immersing it vertically in formulation A to a depth of approximately 60 mm, allowing it to remain immersed undisturbed for 30 sec, then withdrawing it vertically at a constant rate of 40 mm/min. After withdrawal from formulation A, the coated HC-TAC film was allowed to dry at ambient temperature in the air for 15 min. The dried, mounted, coated HC-TAC film was covered first with a thin film (75 µm thick) of Teflon® PTFE then topped with a 5 cm×7.5 cm glass microscope slide to create assembly 1. Assembly 1 was purged under nitrogen atmosphere for 3 min at ambient temperature then heated under nitrogen atmosphere 20 min at 120° C. After cooling to ambient temperature the coated HC-TAC film was removed from assembly 1. The coated HC-TAC film was completely clear, the coating applied from formulation A was smooth and uniform. The coated HC-TAC film had a specular reflectance of 0.87%. The coated HC-TAC film was abraded in accord with the procedures of method 1. After abrasion the absolute value of the change in specular reflectance was 0.25%

Example 2

The procedures of Example 1 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 1.125 g triallylisocyanurate (Diak#7, DuPont) in 95.5 g propyl acetate. The coated HC-TAC film had a specular reflectance of 0.90%. The coated HC-TAC film was abraded in accord with the procedures of method 1. After abrasion the absolute value of the change in specular reflectance was 0.42%.

Example 3

Formulation A was prepared by dissolving 4.5 g Viton® GF-200S fluoroelastomer (DuPont), 0.45 g benzoyl peroxide (Aldrich) and 0.45 g triallylisocyanurate (Diak #7, DuPont) in 95.5 g propyl acetate, then filtering the solution through a 0.2µ Teflon® PTFE membrane filter. A strip of hard-coated triacetyl cellulose (HC-TAC) film (3.7 cm×7.5 cm) was cleaned to remove surface debris by rinsing with a stream of n-hexane followed by rinsing with a stream of iso-propyl alcohol followed by blowing dry with a stream of filtered (0.2µ) nitrogen. The cleaned strip of HC-TAC film was mounted on the surface of a glass microscope slide (5 cm×7.5 cm), with the hard-coated surface of the HC-TAC film facing outward, by fastening the edges of the film to the slide with adhesive tape. The mounted HC-TAC film was surface-treated by application of RIE plasma in accord with the procedures of method 2. The so-treated mounted HC-TAC film was coated with formulation A by immersing it vertically in formulation A to a depth of approximately 60 mm, allowing it to remain immersed undisturbed for 30 sec, then withdrawing it vertically at a constant rate of 25 m m/min. After withdrawal from formulation A, the coated HC-TAC film was allowed to dry at ambient temperature in the air for 15 min. The dried, mounted, coated HC-TAC film was covered first with a thin film (75 µm thick) of Teflon® PTFE then topped with a 5 cm×7.5 cm glass microscope slide to create assembly 1. Assembly 1 was purged under nitrogen atmosphere for 3 min at ambient temperature then heated under nitrogen atmosphere 20 min at 120° C. After cooling to ambient temperature the coated HC-TAC film was removed from assembly 1. The coated HC-TAC film was completely clear, the coating applied from formulation A was smooth and uniform. The coated HC-TAC film had a specular reflectance of 1.25%. The coated HC-TAC film was abraded in accord with the procedures of method 1. After abrasion the absolute value of the change in specular reflectance was 0.18%

Example 4

The procedures of Example 3 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g pentaerythritol tetraacrylate (Aldrich) in 95.5 g propyl acetate. The RIE-treated HC-TAC film was withdrawn from formulation A at a constant rate of 30 mm/min. The coated HC-TAC film had a specular reflectance of 1.09%. The coated HC-TAC film was abraded in accord with the procedures of method 1. After abrasion the absolute value of the change in specular reflectance was 0.32%.

Example 5

The procedures of Example 3 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 1.125 g pentaerythritol tetraacrylate (Aldrich) in 95.5 g propyl acetate. The RIE-treated HC-TAC film was withdrawn from formulation A at a constant rate of 35 mm/min. The coated HC-TAC film had a specular reflectance of 1.0%. The coated HC-TAC film was abraded in accord with the procedures of method 1. After abrasion the absolute value of the change in specular reflectance was 0.29%.

Example 6

The procedures of Example 3 were repeated to prepare a coated HC-TAC film with the following exceptions. Formulation A was prepared by dissolving 4.5 g Viton™ GF-200S fluoroelastomer (DuPont), 0.45 g benzoyl peroxide (Aldrich) and 0.45 g di-pentaerythritol tetraacrylate (SR-355, Sartomer). in 95.5 g propyl acetate. The RIE-treated HC-TAC film was withdrawn from formulation A at a constant rate of 30 mm/min. The coated HC-TAC film had a specular reflectance of 1.16%. The coated HC-TAC film was abraded in accord with the procedures of method 1. After abrasion the absolute value of the change in specular reflectance was 0.49%.

Example 7

Formulation A was prepared by dissolving 4.5 g Viton® GF-200S fluoroelastomer (DuPont), 0.45 g benzoyl peroxide (Aldrich) and 0.23 g pentaerythritol tetraacrylate (Aldrich) in 95.5 g propyl acetate, then filtering the solution through a 0.2µ Teflon® PTFE membrane filter. A strip of hard-coated triacetyl cellulose (HC-TAC) film (3.7 cm×7.5 cm) was cleaned to remove surface debris by rinsing with a stream of n-hexane followed by rinsing with a stream of iso-propyl alcohol followed by blowing dry with a stream of filtered (0.2µ) nitrogen. The cleaned strip of HC-TAC film was mounted on the surface of a glass microscope slide (5 cm×7.5 cm), with the hard-coated surface of the HC-TAC film facing outward, by fastening the edges of the film to the slide with adhesive tape. The mounted HC-TAC film was treated with a solution of 5 wt % acryloxypropyltrimethoxy silane (APTMS, Aldrich) in methanol, which was applied by first swabbing with a cotton tipped applicator then baking the so-applied film 10 min @100° C. in a circulating air oven then removed and cooled to ambient temperature. The so-treated, mounted HC-TAC film was coated with formulation A by immersing it vertically in formulation A to a depth of approximately 60 mm, allowing it to remain immersed undisturbed for 30 sec, then withdrawing it vertically at a constant rate of 30 mm/min. After withdrawal from formulation A, the coated HC-TAC film was allowed to dry at ambient temperature in the air for <15 min. The dried, mounted, coated HC-TAC film was covered first with a thin film (75 µm thick) of Teflon® PTFE then topped with a 5 cm×7.5 cm glass microscope slide to create assembly 1. Assembly 1 was purged under nitrogen atmosphere for 3 min at ambient temperature then heated under nitrogen atmosphere 20 min at 120° C. After cooling to ambient temperature the coated HC-TAC film was removed from assembly 1. The coated HC-TAC film was completely clear, the coating applied from formulation A was smooth and uniform. The coated HC-TAC film had a specular reflectance of 0.99%. The coated HC-TAC film was abraded in accord with the procedures of method 1. After abrasion the absolute value of the change in specular reflectance was 0.08%

Example 8

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.34 g pentaerythritol tetraacrylate (Aldrich) in 95.5 g propyl acetate. The coated HC-TAC film had a specular reflectance of 0.89%. The coated HC-TAC film was abraded in accord with the procedures of method 1. After abrasion the absolute value of the change in specular reflectance was 0.01%.

Example 9

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g pentaerythritol tetraacrylate (Aldrich) in 95.5 g propyl acetate. The coated HC-TAC film had a specular reflectance of 0.88%. The coated HC-TAC film was abraded in accord with the procedures of method 1. After abrasion the absolute value of the change in specular reflectance was 0.01%.

Example 10

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 1.125 g pentaerythritol tetraacrylate (Aldrich) in 95.5 g propyl acetate. The coated HC-TAC film had a specular reflectance of 1.05%. The coated HC-TAC film was abraded in accord with the procedures of method 1. After abrasion the absolute value of the change in specular reflectance was 0.16%.

Example 11

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich)

and 0.45 g pentaerythritol triacrylate (SR-444, Sartomer) in 95.5 g propyl acetate. The ATPMS-treated HC-TAC film was withdrawn from formulation A at a constant rate of 25 mm/min. The coated HC-TAC film had a specular reflectance of 0.92%. The coated HC-TAC film was abraded in accord with the procedures of method 1. After abrasion the absolute value of the change in specular reflectance was 0.04%.

Example 12

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g triallylisocyanurate (Diak #7, DuPont) in 95.5 g propyl acetate. The coated HC-TAC film had a specular reflectance of 0.92%. The coated HC-TAC film was abraded in accord with the procedures of method 1. After abrasion the absolute value of the change in specular reflectance was 0.01%.

Example 13

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 1.125 g triallylisocyanurate (Diak#7, DuPont) in 95.5 g propyl acetate. The coated HC-TAC film had a specular reflectance of 1.09%. The coated HC-TAC film was abraded in accord with the procedures of method 1. After abrasion the absolute value of the change in specular reflectance was 0.19%.

Example 14

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g di-pentaerythritol pentaacrylate (SR-399, Sartomer) in 95.5 g propyl acetate. The coated HC-TAC film had a specular reflectance of 0.94%. The coated HC-TAC film was abraded in accord with the procedures of method 1. After abrasion the absolute value of the change in specular reflectance was 0.0%.

Example 15

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g tris (2-hydroxy ethyl) isocyanurate triacrylate (SR-368, Sartomer) in 95.5 g propyl acetate. The ATPMS-treated HC-TAC film was withdrawn from formulation A at a constant rate of 35 mm/min. The coated HC-TAC film had a specular reflectance of 0.99%. The coated HC-TAC film was abraded in accord with the procedures of method 1. After abrasion the absolute value of the change in specular reflectance was 0.26%.

Example 16

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g triallylcyanurate (Aldrich) in 95.5 g propyl acetate. The 5 wt % solution of APTMS was in ethanol. The ATPMS-treated HC-TAC film was withdrawn from formulation A at a constant rate of 25 mm/min. The coated HC-TAC film had a specular reflectance of 0.78%. The coated HC-TAC film was abraded in accord with the procedures of method 1. After abrasion the absolute value of the change in specular reflectance was 0.07%.

Example 17

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g triallyl-1,3,5-benzenetricarboxylate (Aldrich) in 95.5 g propyl acetate. The 5 wt % solution of APTMS was in ethanol. The ATPMS-treated HC-TAC film was withdrawn from formulation A at a constant rate of 25 mm/min. The coated HC-TAC film had a specular reflectance of 0.85%. The coated HC-TAC film was abraded in accord with the procedures of method 1. After abrasion the absolute value of the change in specular reflectance was 0.02%.

Example 18

The procedures of Example 7 were repeated to prepare a coated HC-TAC film with the following exceptions. Formulation A was prepared by dissolving 4.5 g Viton® GF-200S fluoroelastomer (DuPont), 0.45 g benzoyl peroxide (Aldrich) and 0.45 g triallylisocyanurate (Diak #7, DuPont) in 95.5 g propyl acetate. The mounted HC-TAC film was treated with a solution of 5 wt % allyltrimethoxy silane (ATMS, Aldrich) in ethanol. The ATMS-treated HC-TAC film was withdrawn from formulation A at a constant rate of 25 mm/min. The coated HC-TAC film had a specular reflectance of 0.92%. The coated HC-TAC film was abraded in accord with the procedures of method 1. After abrasion the absolute value of the change in specular reflectance was 0.0%.

Example 19

Formulation A was prepared by dissolving 4.5 g Viton®0 GF-200S fluoroelastomer (DuPont), 0.45 g Irgacure®-651 (Ciba Specialty Chemicals) and 0.45 g triallylisocyanurate (Diak #7, DuPont) in 95.5 g propyl acetate, then filtering the solution through a 0.2µ Teflon® PTFE membrane filter. A strip of hard-coated triacetyl cellulose (HC-TAC) film (3.7 cm×7.5 cm) was cleaned to remove surface debris by rinsing with a stream of iso-propyl alcohol followed by blowing dry with a stream of filtered (0.2µ) nitrogen. The cleaned strip of HC-TAC film was mounted on the surface of a glass microscope slide (5 cm×7.5 cm), with the hard-coated surface of the HC-TAC film facing outward, by fastening the edges of the film to the slide with adhesive tape. The mounted HC-TAC film was treated with a solution of 5 wt % acryloxypropyltrimethoxy silane (APTMS, Aldrich) in ethanol, which was applied by first swabbing with a cotton tipped applicator then baking the so-applied film 10 min at 100° C. in a circulating air oven then removed and cooled to ambient temperature. The so-treated, mounted HC-TAC film was coated with formulation A by immersing it vertically in formulation A to a depth of approximately 60 mm, allowing it to remain immersed undisturbed for 30 sec, then withdrawing it vertically at a constant rate of 25 mm/min. After withdrawal from formulation A, the coated HC-TAC film was allowed to dry at ambient temperature in the air for<15 min. The dried, mounted, coated HC-TAC film was covered with a second 5 cm×7.5 cm glass microscope slide to create assembly 1. Assembly 1 was irradiated with ultra-violet radiation (intensity=22 mWatt/cm$^2$) under nitrogen atmosphere for 5 min while heating to 120° C. After irradiation, assembly 1 was cooled to ambient temperature and the coated HC-TAC film was removed from assembly 1. The coated HC-TAC film was completely clear, the coating applied from formulation A was smooth and uniform. The coated HC-TAC film had a specular reflectance of 0.0.79%. The coated HC-TAC film was abraded in accord with the procedures of method 1. After abrasion the absolute value of the change in specular reflectance was 0.03%

Example 20

The procedures of Example 19 were repeated to prepare a coated HC-TAC film with the following exceptions. Assembly 1 was irradiated with ultra-violet radiation (intensity=22 mWatt/cm$^2$) under nitrogen atmosphere for 5 min while heating to 60° C. The coated HC-TAC film had a specular reflectance of 0.80%. The coated HC-TAC film was abraded in accord with the procedures of method 1. After abrasion the absolute value of the change in specular reflectance was 0.02%.

Example 21

The procedures of Example 19 were repeated to prepare a coated HC-TAC film with the following exceptions. Formulation A was prepared by dissolving 4.5 g Viton® GF-200S fluoroelastomer (DuPont), 0.45 g Irgacure-651 (Ciba Specialty Chemicals) and 0.45 g triallylcyanurate (Aldrich) in 95.5 g propyl acetate. The coated HC-TAC film had a specular reflectance of 0.80%. The coated HC-TAC film was abraded in accord with the procedures of method 1. After abrasion the absolute value of the change in specular reflectance was 0.02%.

Example 22

The procedures of Example 19 were repeated to prepare a coated HC-TAC film with the following exceptions. Formulation A was prepared by dissolving 4.5 g Viton® GF-200S fluoroelastomer (DuPont), 0.45 g Irgacure-651 (Ciba Specialty Chemicals) and 0.45 g triallyl-1,3,5-benzenetricarboxylate (Aldrich) in 95.5 g propyl acetate. The coated HC-TAC film had a specular reflectance of 0.87%. The coated HC-TAC film was abraded in accord with the procedures of method 1. After abrasion the absolute value of the change in specular reflectance was 0.07%.

Example 23

The procedures of Example 19 were repeated to prepare a coated HC-TAC film with the following exceptions. Formulation A was prepared by dissolving 4.5 g Viton® GF-200S fluoroelastomer (DuPont), 0.45 g Irgacure-651 (Ciba Specialty Chemicals) and 0.45 g pentaerythritol tetraacrylate (Aldrich) in 95.5 g propyl acetate. Assembly 1 was irradiated with ultra-violet radiation (intensity=22 mWatt/cm$^2$) under nitrogen atmosphere for 30 min while heating to 120° C. The coated HC-TAC film had a specular reflectance of 0.92%. The coated HC-TAC film was abraded in accord with the procedures of method 1. After abrasion the absolute value of the change in specular reflectance was 0.10%.

Example 24

The procedures of example 19 were repeated to prepare a coated HC-TAC film with the following exceptions. Formulation A was prepared by dissolving 4.5 g Vitone® GF-200S fluoroelastomer (DuPont), 0.45 g Irgacure-651 (Ciba Specialty Chemicals) and 0.45 g pentaerythritol triacrylate (SR-444, Sartomer) in 95.5 g propyl acetate. The coated HC-TAC film had a specular reflectance of 0.81%. The coated HC-TAC film was abraded in accord with the procedures of method 1. After abrasion the absolute value of the change in specular reflectance was 0.16%.

Example 25

The procedures of Example 19 were repeated to prepare a coated HC-TAC film with the following exceptions. Formulation A was prepared by dissolving 4.5 g Viton® GF-200S fluoroelastomer (DuPont), 0.45 g Irgacure-651 (Ciba Specialty Chemicals) and 0.45 g di-pentaerythritol tetraacrylate (SR-355, Sartomer) in 95.5 g propyl acetate. Assembly 1 was irradiated with ultra-violet radiation (intensity=22 mWatt/cm$^2$) under nitrogen atmosphere for 30 min while heating to 120° C. The coated HC-TAC film had a specular reflectance of 1.07%. The coated HC-TAC film was abraded in accord with the procedures of method 1. After abrasion the absolute value of the change in specular reflectance was 0.01%.

Example 26

The procedures of Example 19 were repeated to prepare a coated HC-TAC-film with the following exceptions. Formulation A was prepared by dissolving 4.5 g Viton® GF-200S fluoroelastomer (DuPont), 0.45 g Irgacure-651 (Ciba Specialty Chemicals) and 0.45 g di-pentaerythritol pentaacrylate (SR-399, Sartomer) in 95.5 g propyl acetate. Assembly 1 was irradiated with ultra-violet radiation (intensity=22 mWatt/cm$^2$) under nitrogen atmosphere for 30 min while heating to 120° C. The coated HC-TAC film had a specular reflectance of 0.97%. The coated HC-TAC film was abraded in accord with the procedures of method 1. After abrasion the absolute value of the change in specular reflectance was 0.06%.

Example 27

Formulation A was prepared by dissolving 22.4 g Viton® GF-200S fluoroelastomer (DuPont), 2.19 g benzoyl peroxide (Aldrich) and 2.19 g triallylisocyanurate (Diak #7, DuPont) in 464.6 g propyl acetate, then filtering the solution through a 0.2µ Teflon® PTFE membrane filter. A strip of anti-glare triacetyl cellulose (AG-TAC) film (3.7 cm×7.5 cm) was cleaned to remove surface debris by swabbing both surfaces of the film with iso-propyl alcohol, rinsing with di-ionized water, and blowing dry with an air gun. The cleaned strip of AG-TAC film was mounted on the surface of a glass microscope slide (5 cm×7.5 cm), with the anti-glare surface of the AG-TAC film facing outward, by fastening the edges of the film to the slide with adhesive tape. The mounted AG-TAC film was surface-treated by application of RIE plasma in accord with the procedures of method 2. The so-treated mounted AG-TAC film was coated with formulation A by immersing it vertically in formulation A to a depth of approximately 60 mm, allowing it to remain immersed undisturbed for 30 sec, then withdrawing it vertically at a constant rate of 18 mm/min. After withdrawal from formulation A, the coated AG-TAC film was allowed to dry at ambient temperature in the air for 15 min. The dried, mounted, coated AG-TAC film was covered first with a thin film (75 μm thick) of Teflon® PTFE then topped with three 5 cm×7.5 cm glass microscope slides and a 100 g weight to create assembly 1. Assembly 1 was purged under nitrogen atmosphere for 5 min. at ambient temperature then heated (on hot plate) under nitrogen atmosphere 20 min at 120° C. After cooling to ambient temperature the coated AG-TAC film was removed from assembly 1. The coated AG-TAC film was opaque or uniformly hazy, the coating applied from formulation A was smooth and uniform. The coated AG-TAC film had a total reflectance of 2.06%. The coated AG-TAC film was abraded in accord with the procedures of method 1. After abrasion the absolute value of the change in total reflectance was 0.07%.

What is claimed is:

1. A composite structure comprising a substrate and an anti-reflective coating applied to the substrate, wherein the anti-reflective coating comprises the cured product of:
   A) a fluoroelastomer having cures sites selected from the group consisting of bromine atoms, chlorine atoms, iodine atoms, non-conjugated dienes, and mixtures of two or more thereof; and
   B) a non-fluorinated multiolefinic cross linking agent having the formula:

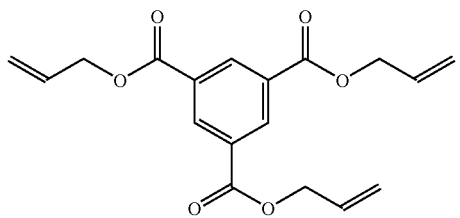

2. The structure of claim 1, wherein the fluoroelastomer, having cure sites, comprises copolymerized units of iodinated olefins.

3. The structure of claim 1, wherein the fluoroelastomer, having cure sites, comprises copolymerized units of iodinated unsaturated ethers.

4. The structure of claim 1, wherein at least one cure site is selected from the group consisting of iodine atoms that are present at terminal positions on fluoroelastomer chains.

5. The structure of claim 1, wherein the fluoroelastomer is a copolymer comprising units of vinylidene fluoride, hexafluoropropylene, tetrafluoroethylene, and iodinated olefins.

6. A composite structure comprising a substrate and an anti-reflective coating applied to the substrate, wherein the anti-reflective coating comprises the cured product of:
   A) a fluoroelastomer having cures sites selected from the group consisting of bromine atoms, chlorine atoms, iodine atoms, non-conjugated dienes, and mixtures of two or more thereof; and
   B) a non-fluorinated multiolefinic cross linking agent having the formula:

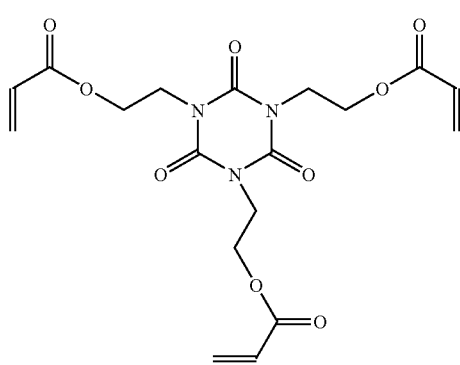

7. The structure of claim 6, wherein the fluoroelastomer, having cure sites, comprises copolymerized units of iodinated olefins.

8. The structure of claim 6, wherein the fluoroelastomer, having cure sites, comprises copolymerized units of iodinated unsaturated ethers.

9. The structure of claim 6, wherein at least one cure site is selected from the group consisting of iodine atoms that are present at terminal positions on fluoroelastomer chains.

10. The structure of claim 6, wherein the fluoroelastomer is a copolymer comprising units of vinylidene fluoride, hexafluoropropylene, tetrafluoroethylene, and iodinated olefin.

* * * * *